(12) United States Patent
Nomura et al.

(10) Patent No.: US 7,065,770 B2
(45) Date of Patent: Jun. 20, 2006

(54) SYSTEM FOR SUPPLYING A PROGRAM FROM A SERVER TO A PRINTING DEVICE THROUGH A NETWORK BASED ON OPERATING ENVIRONMENT CHARACTERISTICS OF INSTALLED OPTIONAL UNITS

(75) Inventors: Tatsuo Nomura, Kyoto (JP); Syoichiro Yoshiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 733 days.

(21) Appl. No.: 09/892,512

(22) Filed: Jun. 28, 2001

(65) Prior Publication Data

US 2002/0002604 A1    Jan. 3, 2002

(30) Foreign Application Priority Data

Jun. 30, 2000   (JP) .............................. P2000-199122

(51) Int. Cl.
*G06F 13/10* (2006.01)
(52) U.S. Cl. ................. 719/327; 719/321; 710/8; 710/10
(58) Field of Classification Search ............... 709/219, 709/220, 226; 705/59; 399/8; 717/178, 717/167; 347/15; 711/154; 715/530; 380/277; 719/327, 321; 710/8, 10
See application file for complete search history.

(56) References Cited

U.S. PATENT DOCUMENTS

| | | | |
|---|---|---|---|
| 4,999,806 A |   | 3/1991 | Chernow et al. |
| 5,404,199 A | * | 4/1995 | Hirata et al. .................. 399/8 |
| 5,421,009 A |   | 5/1995 | Platt |
| 5,555,416 A |   | 9/1996 | Owens et al. |
| 5,623,604 A | * | 4/1997 | Russell et al. ............. 717/167 |
| 5,657,448 A | * | 8/1997 | Wadsworth et al. ........ 709/220 |
| 5,664,195 A |   | 9/1997 | Chatterji |
| 5,708,709 A | * | 1/1998 | Rose ............................ 705/59 |
| 5,815,722 A | * | 9/1998 | Kalwitz et al. ............. 717/178 |
| 5,859,969 A |   | 1/1999 | Oki et al. |
| 5,881,236 A |   | 3/1999 | Dickey |
| 6,073,124 A | * | 6/2000 | Krishnan et al. ............. 705/59 |

(Continued)

FOREIGN PATENT DOCUMENTS

JP        64-68058       3/1989

(Continued)

OTHER PUBLICATIONS

Oh! PC, vol. 19, No. 6 SOFTBANK Publishing Inc., Jul. 1, 2000, pp. 148-151 (Patent Office CSDB Document No.: Domestic Technology Magazine 200200995019, ISSN: 0910-7606.

(Continued)

*Primary Examiner*—Le Hien Luu
(74) *Attorney, Agent, or Firm*—Nixon & Vanderhye, PC

(57) ABSTRACT

An object of the invention is to determine, when installing a program in a terminal through the Internet, whether the program is operable or not, and notify the result of the determination to the terminal. In a system of the present invention, the operating environment of an image forming apparatus is determined, a program list showing programs operable in the operating environment is generated at a server, and the program list is supplied to the image forming apparatus. A program selected from the program list is requested from the server, and then the program is supplied from the server to the image forming apparatus. That is, a program is selected from a list of programs determined operable in the operating environment of the image forming apparatus, and is supplied to the image forming apparatus.

15 Claims, 8 Drawing Sheets

U.S. PATENT DOCUMENTS

| | | | |
|---|---|---|---|
| 6,134,593 A | 10/2000 | Alexander et al. | |
| 6,195,432 B1 * | 2/2001 | Takahashi et al. | 380/277 |
| 6,243,725 B1 * | 6/2001 | Hempleman et al. | 715/530 |
| 6,321,266 B1 * | 11/2001 | Yokomizo et al. | 709/226 |
| 6,382,757 B1 * | 5/2002 | Kakutani | 347/15 |
| 6,418,554 B1 | 7/2002 | Delo et al. | |
| 6,523,166 B1 | 2/2003 | Mishra et al. | |
| 6,546,554 B1 | 4/2003 | Schmidt et al. | |
| 6,594,737 B1 * | 7/2003 | Niwa et al. | 711/154 |
| 6,606,744 B1 | 8/2003 | Mikurak | |
| 6,735,625 B1 | 5/2004 | Ponna | |
| 6,766,366 B1 | 7/2004 | Schäfer et al. | |

FOREIGN PATENT DOCUMENTS

| | | |
|---|---|---|
| JP | 4-155566 | 5/1992 |
| JP | 8-190472 A | 7/1996 |
| JP | 9-512126 | 12/1997 |
| JP | 10-91453 A | 4/1998 |
| JP | 10-207710 A | 9/1998 |
| JP | 10-293688 A | 11/1998 |
| JP | 11-144376 A | 5/1999 |
| JP | 2000-207219 A | 7/2000 |
| WO | WO96/35158 | 11/1996 |

OTHER PUBLICATIONS

Japanese Notice of Refusal mailed Apr. 6, 2004 and translation thereof in corresponding Japanese application No. 2000-207356 in co-pending U.S. Appl. No. 09/892,747.

U.S. Application of Nomura et al, filed Jun. 28, 2001, entitled "A Method and a System for Supplying Programs".

* cited by examiner

SYSTEM FOR SUPPLYING A PROGRAM FROM A SERVER TO A PRINTING DEVICE THROUGH A NETWORK BASED ON OPERATING ENVIRONMENT CHARACTERISTICS OF INSTALLED OPTIONAL UNITS

BACKGROUND OF THE INVENTION

1. Field of the Invention

The present invention relates to a program supplying system and a program supplying method for selling and buying programs through a network.

2. Description of the Related Art

Various systems have been proposed for selling and buying programs through the Internet. For example, Japanese Unexamined Patent Publication JP-A 9-512126 (1997) discloses an apparatus for selling and buying programs through the Internet while protecting the copyrights of the programs.

Japanese Unexamined Patent Publication JP-A 1-68058 (1989) discloses a facsimile apparatus with extension functions. This facsimile apparatus receives a program for the extension functions through communication means. By executing this program, the facsimile apparatus performs functions that were unavailable when the apparatus was first purchased.

However, when using the apparatus described in JP-A 9-512126, the user, before buying a program, must check the operating environment of his or her terminal such as a personal computer to determine whether the program is operable in the operating environment or not, that is whether the program may be installed and run in the terminal. By using the system after determining that the program is operable, the program is downloaded to his or her terminal through the Internet. The program purchased in this way is a sheer waste when the user fails to grasp the operating environment of his or her own terminal accurately, or overlooks part of the operating environment and makes a wrong decision that the system allows operation of the program.

The facsimile apparatus described in JP-A 1-68058 merely receives a program through the communication means. Before receiving the program, the user must check and determine whether the program is operable in the operating environment of the apparatus. Thus, a misjudgment will result in a non-execution of the program, incapacitating the extension functions.

Further, with a complex type digital image forming apparatus developed in recent years, a basic function is set first, and then combined with desired functions selected from among various extension functions to meet diverse demands of the user. No problem arises when extension functions are selected and incorporated into the basic function in time of purchase of the apparatus. When extension functions are combined to the basic function after purchase of the apparatus, the user must select a new program, and determine whether this program may be installed and run in the apparatus. As noted above, a misjudgment renders the program purchased totally useless.

SUMMARY OF THE INVENTION

The present invention has been made having regard to the drawbacks of the prior art. An object of the invention is to provide a program supplying system and a program supplying method for determining, when installing a program in a terminal through the Internet, whether the program is operable or not, and notifying the result of the determination to the terminal.

To achieve the above object, the invention provides a program supplying method for supplying a program from a server through a network to a user terminal including a terminal main body and optional units combined therewith, the method comprising the steps of transmitting operating environment information indicative of an operating environment of the user terminal which is changed according to a combination of the optional units from the user terminal through the network to the server before the program is supplied, and determining whether the program is operable in the operating environment based on the operating environment information and transmitting a result of determination from the server through the network to the user terminal.

According to the method of the invention noted above, a determination is made whether a program is operable in the operating environment of the user terminal based on the operating environment information, and the result of the determination is transmitted to the user terminal. Thus, the server, or the dealer, can sell reliably operable programs after confirming that the programs are operable, thereby realizing improved services.

The method according to the invention further comprises the step of displaying the result of the determination about whether the program is operable in the user terminal.

In addition, the method according to the invention further comprises the step of transmitting an order for the program from the user terminal through the network to the server when the program is determined operable.

Purchase of a useless program may be avoided by ordering a program after the user terminal confirms whether the program is operable in the operating environment of the terminal as noted above. On the part of the dealer, selling of useless programs can be avoided to improve its services.

The method according to the invention further comprises the steps of generating a program list indicative of programs which can be supplied by the server, transmitting the program list from the server through the network to the user terminal, and selecting a program from the program list.

By providing the user terminal with the program list for allowing a program to be selected from the program list, a required program can be selected properly from among numerous programs. Thus, utilization of program is improved for the user. The dealer at the server can introduce an increased number of programs to the user, thereby improving its services.

In addition, the method according to the invention further comprises the steps of generating a program list indicative of programs operable in the operating environment of the user terminal based on the operating environment information, transmitting the program list from the server through the network to the user terminal, and selecting a program from the program list.

In this way, the user terminal is provided with the program list indicative of programs operable in the operating environment of the user terminal. As long as a program is selected from this program list, the selected program can be operated in the user terminal.

The method according to the invention further comprises the step of, when the program is determined as being operable, recording the result of determination as information on the user terminal, at the server.

By recording at the server the result of determination that the program is inoperable as noted above, the dealer is aware of the user's requirement having not been met at the server. New programs can be developed to meet the user's requirement, thereby improving the services.

In addition, the method according to the invention further comprises the step of installing the program supplied from the server through the network to the user terminal, thereby extending functions of the user terminal.

That is, the newly installed program extends the functions of the user terminal.

Next, the invention provides a program supplying system comprising:

a user terminal including a terminal main body and optional units combined therewith; and a server from which a program is supplied through a network to the user terminal, wherein the user terminal further includes operating environment determining means for determining an operating environment of the user terminal which is changed according to a combination of the optional units, and transmits operating environment information indicative of the determined operating environment through the network to the server before the program is supplied, and wherein the server includes operation determining means for determining whether the program is operable in the operating environment based on the operating environment information received, and transmits a result of determination as to operability through the network to the user terminal.

According to the system of the invention noted above, a determination is made whether a program is operable in the operating environment of the user terminal, and the result of the determination is transmitted to the user terminal. Thus, the server, or the dealer, can sell reliably operable programs after confirming that the programs are operable, thereby realizing improved services.

In the system according to the invention, the user terminal further includes operating and inputting means operable by a user, and display means for displaying information, the user terminal being started in response to an operation of the operating and inputting means to transmit the operating environment information indicative of the operating environment determined by the operating environment determining means through the network to the server, and to display the result of the determination received from the operation determining means of the server on the display means.

In addition, in the system according to the invention, the user terminal orders the program from the server upon receipt from the server of the result of the determination that the program is operable.

Purchase of a useless program can be avoided by ordering a program after the user terminal confirms whether the program is operable in the operating environment of the terminal as noted above. On the part of the dealer, selling of useless programs can be avoided to improve its services.

In the system according to the invention, the server further includes list generating means for generating a program list indicative of programs which can be supplied to the user terminal, and transmits the program list through the network to the user terminal, and the user terminal displays the program list on the display means, and selects a program from the program list in response to an operation of the operating and inputting means.

By providing the user terminal with a program list for allowing a program to be selected from the program list, a required program may be selected properly from among numerous programs. Thus, utilization of program is improved for the user. The dealer at the server can introduce an increased number of programs to the user, thereby improving its services.

In the system according to the invention, the server further includes list generating means for generating a program list indicative of programs operable in the operating environment of the user terminal, and transmits the program list through the network to the user terminal, and the user terminal displays the program list on the display means, and selects a program from the program list in response to an operation of the operating and inputting means.

In this way, the user terminal is provided with the program list indicative of programs operable in the operating environment of the user terminal. As long as a program is selected from this program list, the selected program may be operated in the user terminal.

In the system according to the invention, the server further includes recording means for recording information on the user terminal, and records the result of determination in the recording means when the operation determining means determines that the program is inoperable.

By recording at the server the result of determination that the program is inoperable as noted above, the dealer is aware of the user's requirement having not been met at the server. New programs can be developed to meet the user's requirement, thereby improving the services.

Further, in the system according to the invention, the user terminal may install the program supplied from the server to the user terminal through the network, thereby extending functions of the user terminal.

That is, the newly installed program extends the functions of the user terminal.

In the system according to the invention, the user terminal is at least one of a personal computer and a complex type digital image forming apparatus.

The invention provides a program supplying system comprising:

a user terminal; and a server from which a program is supplied through a network to the user terminal, wherein the user terminal includes operating environment determining means for determining an operating environment of the user terminal, and transmits operating environment information indicative of the determined operating environment through the network to the server before the program is supplied, and wherein the server includes operation determining means for determining whether the program is operable in the operating environment based on the operating environment information received, and transmits a result of determination as to operability through the network to the user terminal.

In the system according to the invention, the user terminal is a portable terminal.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
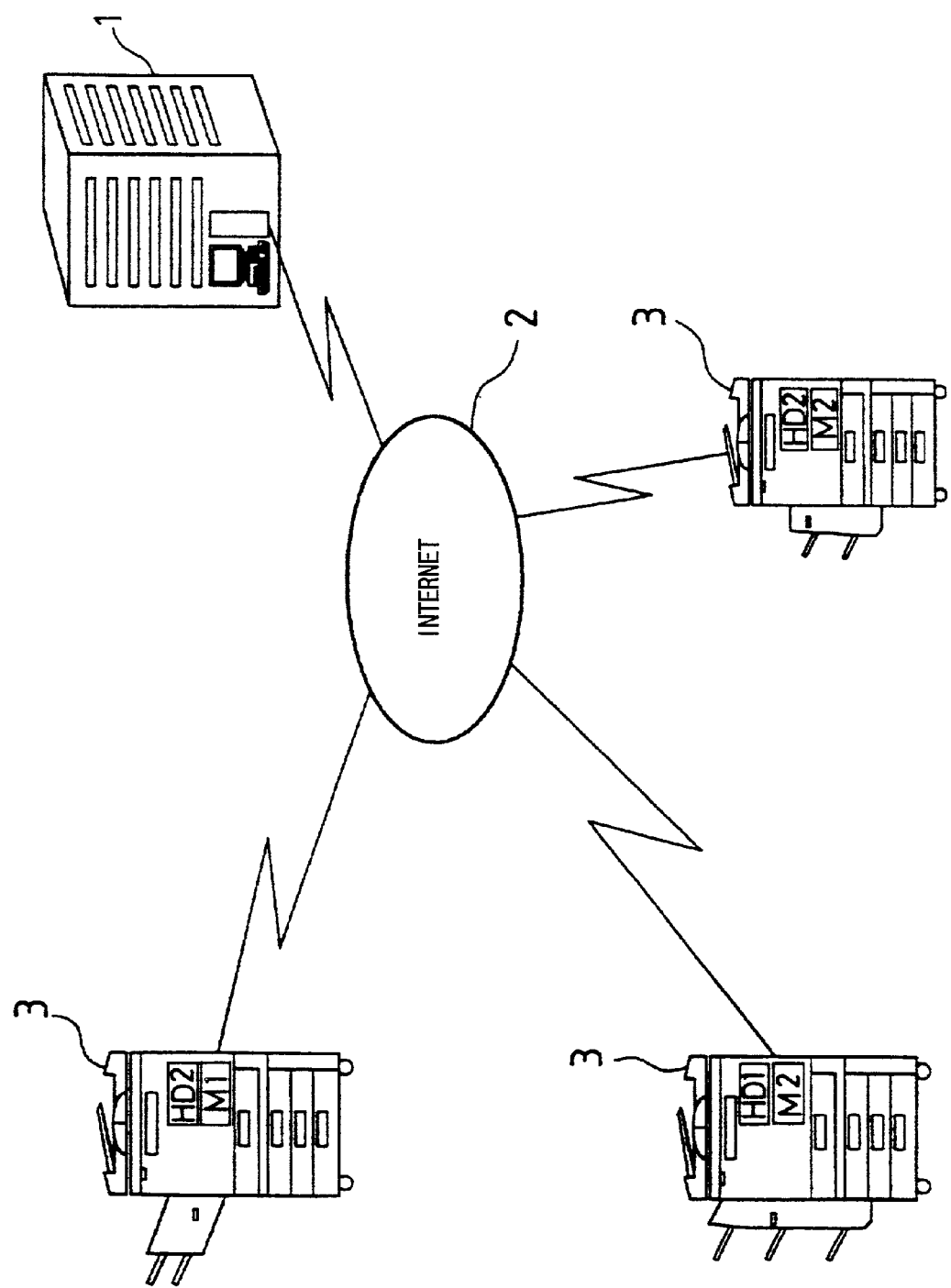
FIG. 1 is a view schematically showing a program supplying system in one embodiment of the present invention.

Now referring to the drawings, preferred embodiments of the invention are described below.

FIG. 1 schematically shows a program supplying system in one embodiment of the invention. In this system, a server 1 is connected to a plurality of complex type digital image forming apparatuses 3 as user terminals through the Internet 2. The server 1 is installed on a program dealer side, and stores numerous programs. Each complex type digital image forming apparatus 3 is installed on a user side for reading original images and recording the images on recording paper.

Figure 2:
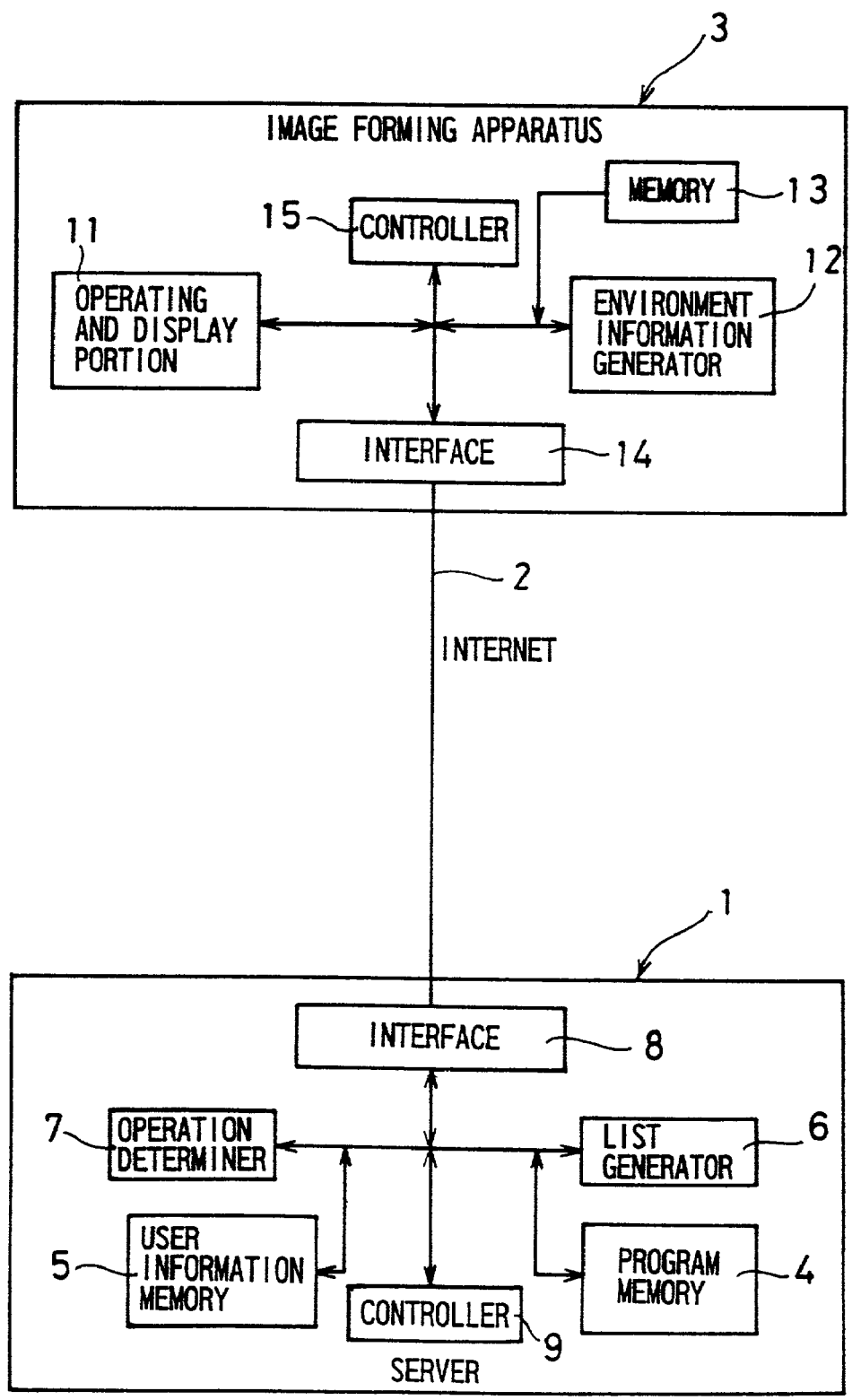
FIG. 2 is a block diagram showing constructions of a server and a complex type digital image forming apparatus in the system of FIG. 1.

FIG. 2 shows constructions of the server 1 and the complex type digital image forming apparatus 3. The server 1 includes a program memory 4 for storing the numerous programs, a user information memory 5 for storing user information, a list generator 6 for making a program list, an operation determiner 7 for determining whether a given program is operable in a given operating environment, an interface 8 connected to the Internet 2, and a controller 9 for carrying out a general control over the server 1.

The image forming apparatus 3 includes an operating and display portion 11 having operation keys and a display screen, an environment information generator 12 for determining the operating environment of the image forming apparatus 3 and generating environment information showing the operating environment, a memory 13 for storing various programs and data, an interface 14 connected to the Internet 2, and a controller 15 for carrying out a general control over the image forming apparatus 3.

Figure 3:
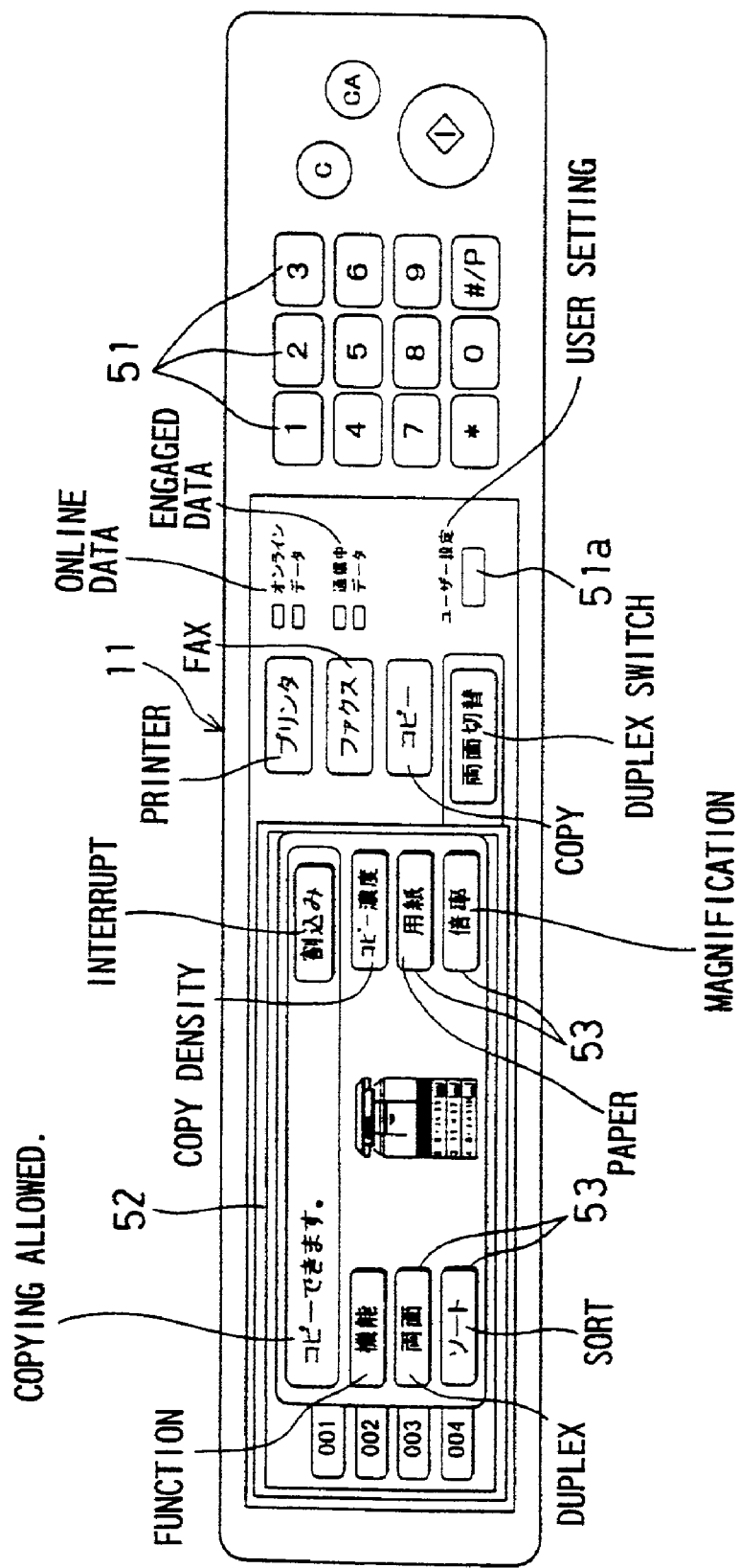
FIG. 3 is a view showing an operating and display portion of the complex type digital image forming apparatus in the system of FIG. 1.

FIG. 3 shows the operating and display portion 11 of the image forming apparatus 3. The operating and display portion 11 has a plurality of operation keys 51 and a display screen 52. The operation keys 51 are operable to give various instructions to the controller 15. The controller 15 displays various information on the display screen 52. A touch panel (not shown) is disposed on the display screen 52. When the user presses one of operation buttons 53 displayed on the display screen 52, the touch panel detects a pressed position to determine the operation button 53 pressed. In this way, various instructions may be given to the controller 15.

Figure 4:
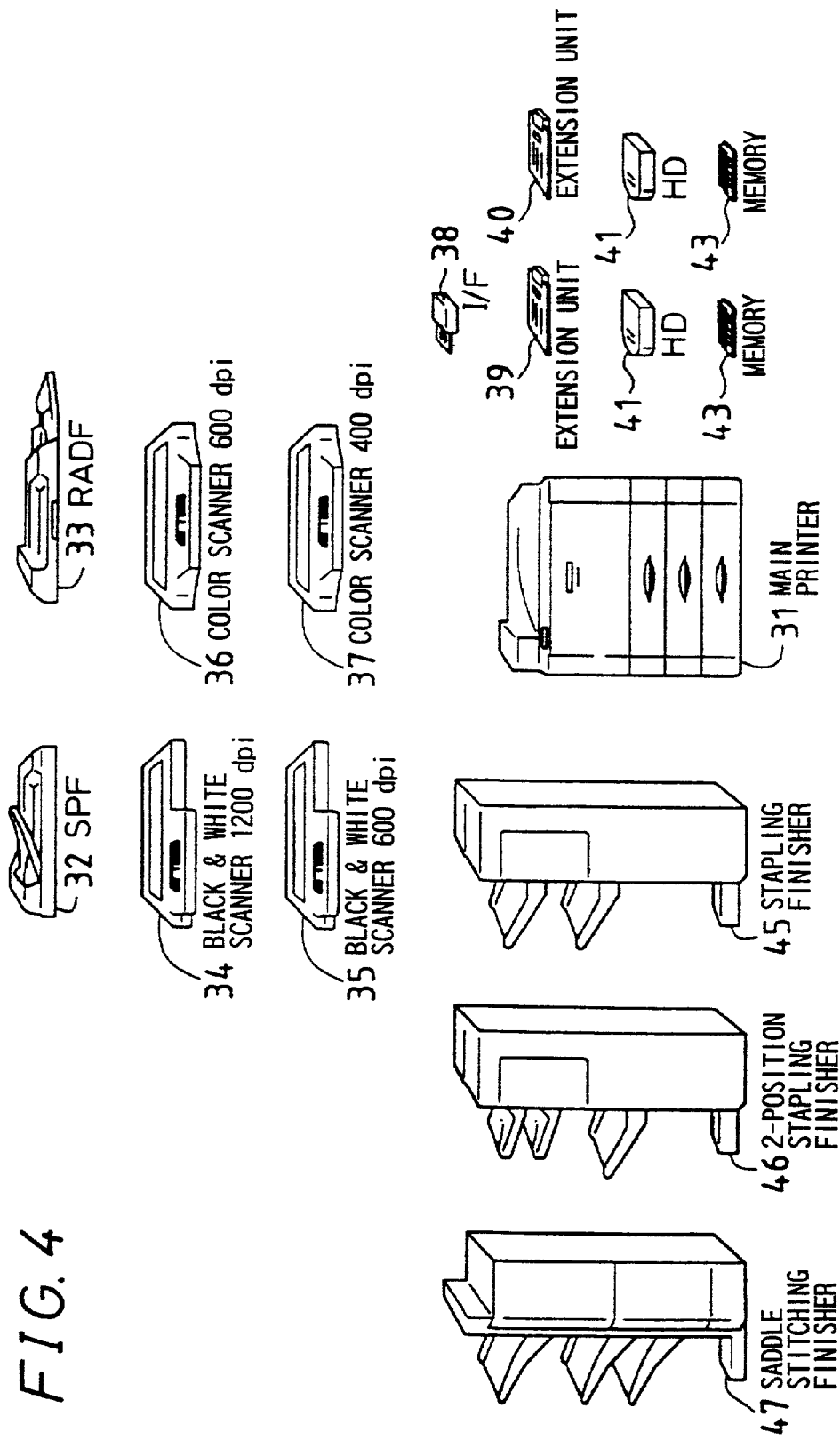
FIG. 4 is a view showing extension functions of the complex type digital image forming apparatus in the system of FIG. 1.

As shown in FIG. 4, the image forming apparatus 3 includes a main printer 31, as a terminal main body, having a basic printer function, and various optional units 32 to 47. The various optional units 32 to 47 are selectively combined with the main printer 31. The various optional units include SPF automatic document feeder 32 and RADF automatic document feeder 33, black-and-white scanners 34 and 35 with resolutions 1200 (dpi) and 600 (dpi), color scanners 36 and 37 with resolutions 600 (dpi) and 400 (dpi), an interface 38, two types of extension units 39 and 40, two types of hard disks 41 and 42, two types of memories 43 and 44, a finisher 45 for stapling only one position, a finisher 46 for stapling two positions, and a finisher 47 for stapling two positions and saddle stitching. Though not shown, other optional units and plural types of sorters also are made available.

The operating environment of the image forming apparatus 3 is changed according to the combination of the various optional units 32–47.

When purchasing such image forming apparatus 3, the main printer 31 is purchased alone or along with some of the optional units to be attached to the main printer 31. When, subsequently, the user desires to add new functions, new optional units are appropriately selected and added to the main printer 31 or old optional units are replaced with new optional units. Along with the addition and replacements of optional units, a program for controlling the image forming apparatus 3 must also be added or updated. Thus, the user obtains a required program from the server 1 through the Internet 2.

However, when the user appropriately incorporates various optional units into the image forming apparatus 3, the operating environment of the image forming apparatus 3 variously changes. While numerous programs are provided at the server 1 to cope with such various changes in the operating environment, in order to select the required program from among the programs, the user must accurately grasps the operating environment of the image forming apparatus 3 and select a program suited to the operating environment. If the user has an inadequate grasp of the operating environment and select a wrong program, not only the image forming apparatus 3 would fail to function effectively, but also the program would prove inoperable and useless. It is a heavy burden on the part of the user to have to grasp the operating environment changeable variously and to select a program suited to the operating environment. The user would inevitably make a mistake in the selection of a program.

To avoid such a situation, this embodiment allows a determination to be made, before a program is supplied, whether the program is operable in the operating environment of the image forming apparatus 3. A processing procedure therefor will be described with reference to FIGS. 5 and 6A to 6E.

Figure 6A:
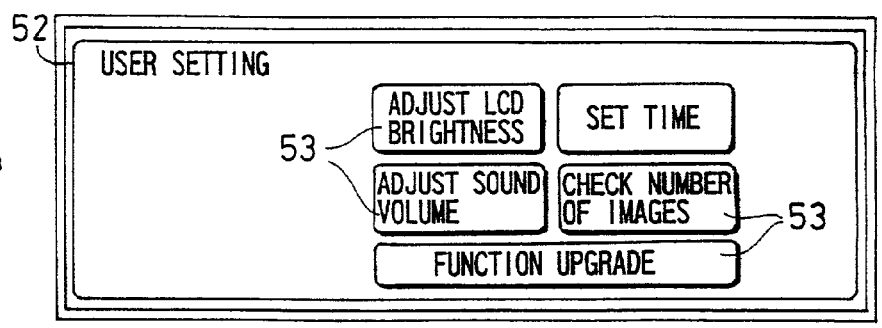
FIGS. 6A–6E are views showing the contents displayed on a display screen of the complex type digital image forming apparatus during the procedure of FIG. 5.

First, when a user setting key 51a on the operating and display portion 11 is pressed, the controller 15, in response thereto, changes the contents displayed on the display screen 52 as shown in FIG. 6A. A plurality of operation buttons 53 is displayed on the display screen 52. When one of the operation buttons 53 is pressed, the pressed position is detected by the touch panel. From this position the controller 15 identifies the operation button 53 pressed, and carries out a process indicated in the range of this operation button 53.

In this instance, since a program is to be obtained on the assumption that the functions of the image forming apparatus 3 are extended, the operation button 53 indicative of "Function upgrade" is pressed. In response to this, the controller 15 calls the server 1 through the Internet 2, and requests a program list from the server 1 as shown in FIG. 5.

Figure 5:
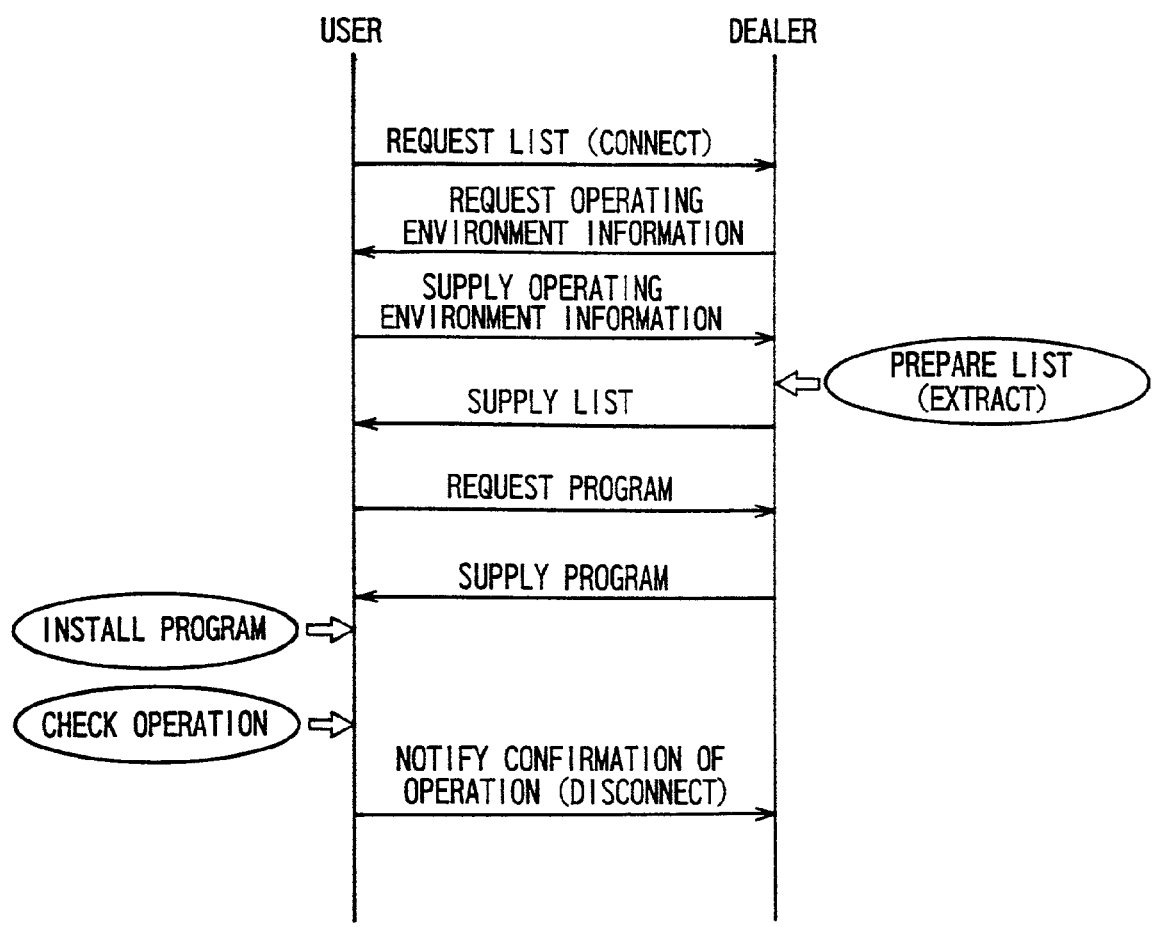
FIG. 5 is a view showing a procedure of transmitting a program between the server and the complex type digital image forming apparatus in the system of FIG. 1.

At the server 1, the controller 9, upon receipt of the request for a program list from the image forming apparatus 3, requests operating environment information indicative of the operating environment of the image forming apparatus 3 through the Internet 2 from the image forming apparatus 3 as shown in FIG. 5.

Figure 6B:
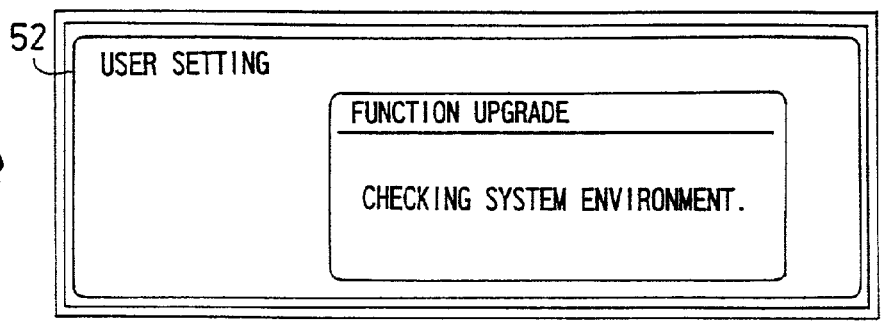

At the image forming apparatus 3, the controller 15, upon receipt of the request for the operating environment information from the server 1, starts the environment information generator 12, and displays "Checking system environment." on the display screen 52 as shown in FIG. 6B. The environment information generator 12 determines the operating environment of the image forming apparatus 3, and generates the operating environment information.

The operating environment of the image forming apparatus 3 variously changes when the various optional units for the image forming apparatus 3 are appropriately combined at the user as noted hereinbefore. In the case where, for example, the image forming apparatus 3 includes the main printer 31, shown in FIG. 4, combined with the SPF automatic document feeder 32, the black-and-white scanner 34, the interface 38, the expansion unit 39, the hard disk 41, the memory 43 and the finisher 47, and when the black-and-white scanner 34 is detached but the color scanner 36 is attached, the operating environment of the image forming apparatus 3 is changed. The environment information generator 12 determines the operating environment changed, and generates operating environment information indicative of the operating environment. Then, the environment information generator 12 transmits the operating environment information through the Internet 2 to the server 1 as shown in FIG. 5.

At the server 1, the operating environment information is applied to the operation determiner 7. At this time, the list generator 6 searches the numerous programs in the program memory 4, retrieves all programs that can be supplied to the image forming apparatus 3, and applies these programs to the operation determiner 7. The operation determiner 7 determines the operating environment of the image forming apparatus 3 shown in the environment information, selects programs operable in the operating environment from among all the programs that can be supplied to the image forming apparatus 3, and notifies the selected programs to the list generator 6. The list generator 6 generates a program list indicative of these programs, and the program list is transmitted through the Internet 2 to the image forming apparatus 3 as shown in FIG. 5.

Figure 6C:
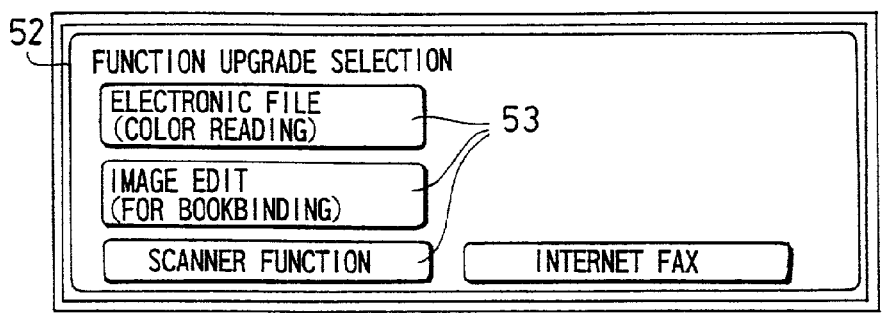

At the image forming apparatus 3, the controller 15, upon receipt of the program list from the server 1, displays the program list on the display screen 52 as shown in FIG. 6C. This program list includes a plurality of operation buttons 53. In these operation buttons 53, program names "Electronic file (color reading)", "Image edit (for bookbinding)", "Scanner function" and "Internet fax" are displayed. These program names are only exemplary, and the number of program names is not restricted.

The program name "Electronic file (color reading)" indicates a program for use when the color scanner 36 or 37 is attached to the main printer 31. When the color scanner 36 or 37 is selected, a process that an original image is read for each of colors and image data of each color is stored in a hard disk, is carried out. However, such a process results in an amount of entire image data becoming large, therefore, a number of images to be stored is restricted.

The program name "Image edit (for bookbinding)" indicates a program for use when the finisher 47 for stapling two positions and saddle stitching is attached to the main printer 31.

The program name "Scanner function" indicates a program for reading an original image with a scanner and transmitting image data as e-mail.

The program name "Internet fax" indicates a program for performing facsimile communication through a telephone line or through the Internet upon giving a telephone number.

In this instance, the black-and-white scanner 34 is detached, but the color scanner 36 is attached as noted hereinbefore. Thus, the user presses the operation button 53 showing "Electronic file (color reading)". The controller 15 identifies this operation button 53, and requests the program named "Electronic file (color reading)" from the server 1 through the Internet 2 as shown in FIG. 5.

At the server 1, the controller 9, upon receipt of the request for the program named "Electronic file (color reading)", retrieves this program from the program memory 4 and supplies the program through the Internet 2 to the image forming apparatus 3 as shown in FIG. 5.

Figure 6D:
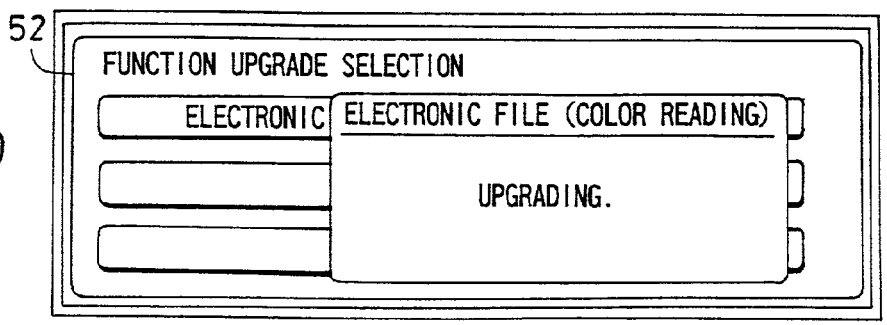
Figure 6E:
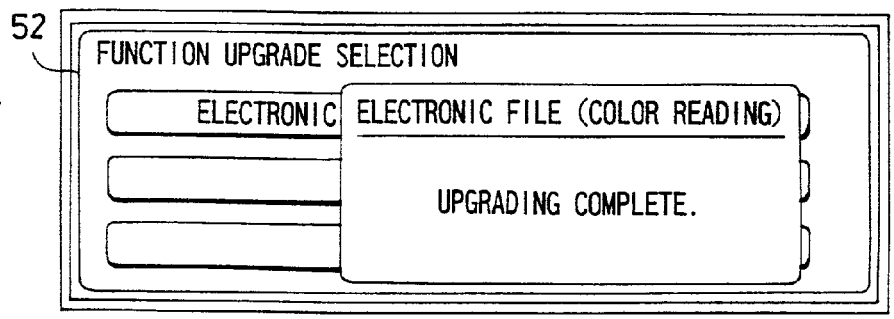

At the image forming apparatus 3, the controller 15 displays "Upgrading." on the display screen 52 as shown in FIG. 6D, stores the program "Electronic file (color reading)" in the memory 13, and runs this program for trial. When the trial run of this program is completed without trouble, the controller 15 displays "Upgrading complete." on the display screen 52 as shown in FIG. 6E, and notifies a confirmation of operation through the Internet 2 to the server 1 as shown in FIG. 5. Further, the controller 15 ends the communication with the server 1 and disconnects the line.

In this embodiment, as described above, the operating environment of the image forming apparatus 3 is determined, the server 1 generates a program list indicative of programs operable in the operating environment, this program list is given to the image forming apparatus 3, a program selected from this program list is requested from the server 1, and the server 1 supplies this program to the image forming apparatus 3. That is, a program is selected from a list of programs determined operable in the operating environment of the image forming apparatus 3, and supplied to the image forming apparatus 3. Thus, the image forming apparatus 3 is supplied with only programs that operate certainly. On the part of the server 1, its services are improved with no possibility of supplying programs that will prove inoperable.

The user of the image forming apparatus 3, without the knowledge of a specific program to be installed with an attachment of a color scanner, may select a program to be installed by looking at a program list. Further, the dealer at the server 1 can introduce an increased number of programs to the user to realize improved services.

Next, another processing procedures for supplying a program will be described with reference to FIG. 7.

Figure 7:
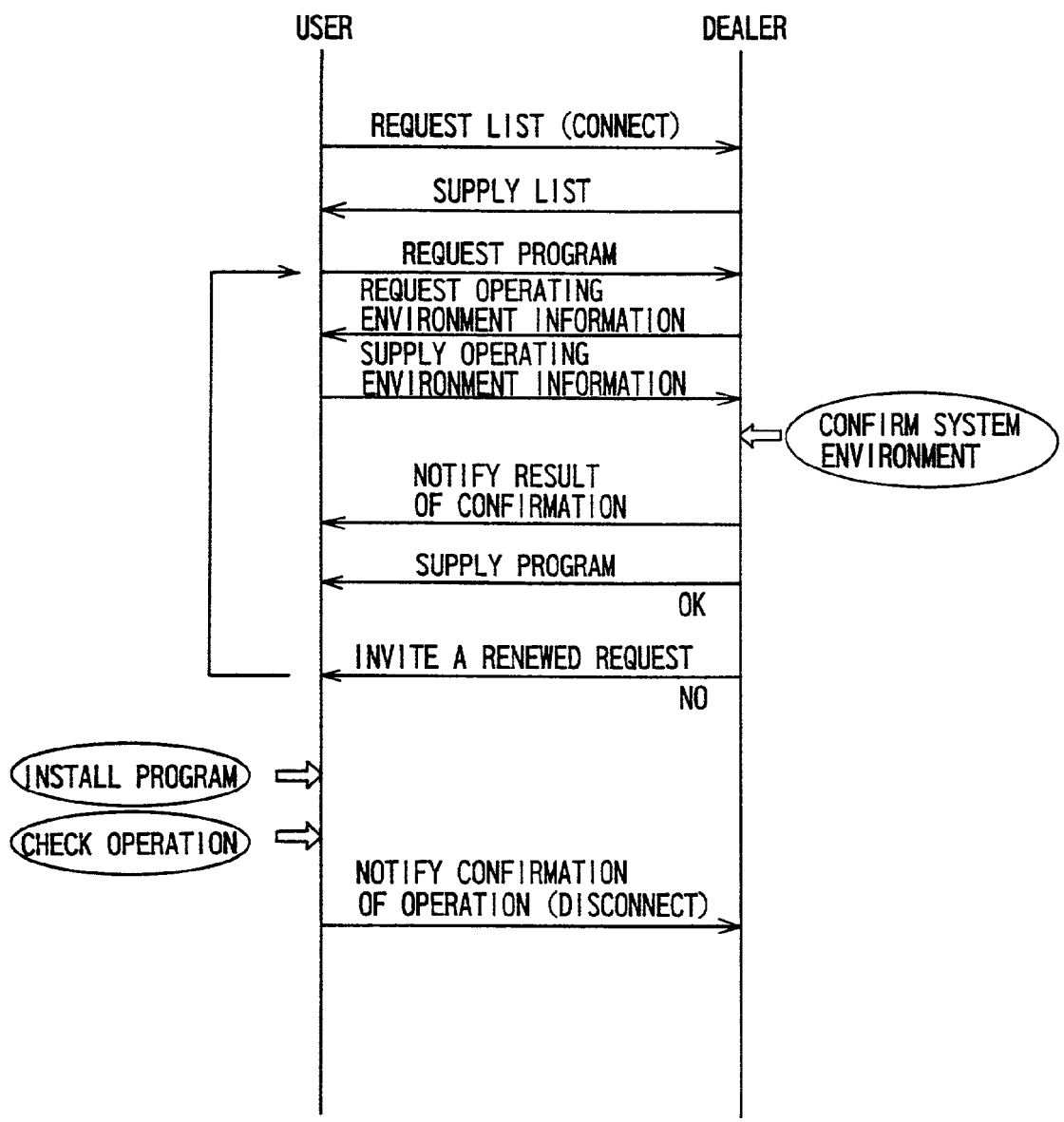
FIG. 7 is a view showing a different procedure of transmitting a program between the server and the complex type digital image forming apparatus in the system of FIG. 1.

First, when a function upgrading is instructed by operating the operation key 51 on the operating and display portion 11 or the operation button 53 on the display screen 52, the controller 15 calls the server 1 through the Internet 2, and requests a program list from the server 1 as shown in FIG. 7.

At the server 1, the list generator 6 receives the request for a program list, and generates a program list showing numerous programs prepared beforehand for the image forming apparatus 3. Then, the list generator 6 transmits the program list through the Internet 2 to the image forming apparatus 3 as shown in FIG. 7.

When this program list is generated, the operating environment of the image forming apparatus 3 is not taken into account. The program list includes all programs that can be supplied to the image forming apparatus 3. In addition, the contents of the program list are merely changed to suit the dealer's convenience. Thus, the program list may be generated beforehand to be supplied on request.

Figure 8:
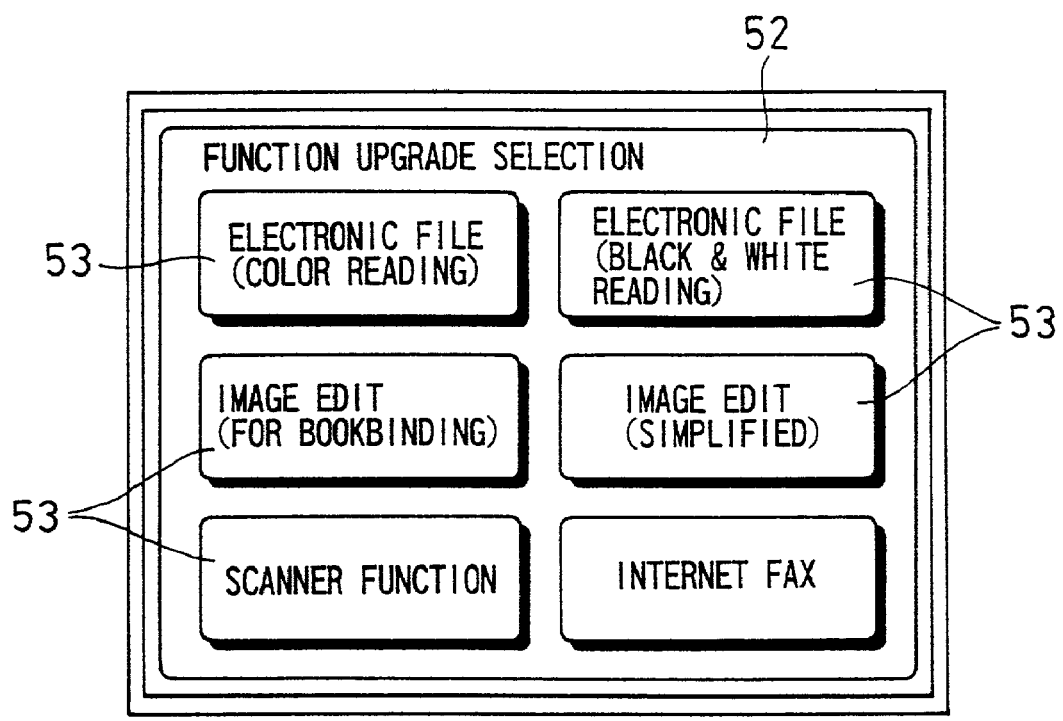
FIG. 8 is a view showing a program list displayed on the display screen of the complex type digital image forming apparatus during the procedure of FIG. 7.

At the image forming apparatus 3, the controller 15, upon receipt of the program list from the server 1, displays the program list on the display screen 52 as shown in FIG. 8. When a required program is selected from this program list by operating the operation key or the operation button, the controller 15 requests the selected program from the server 1 through the Internet 2 as shown in FIG. 7.

Since, in this instance, the program list has been generated without taking the operating environment of the image forming apparatus 3 into account, the program name "Electronic file (color reading)" and the program name "Electronic file (black-and-white reading)" are both displayed. Only one, and not both, of the programs under these program names is operable in the operating environment of the image forming apparatus 3. Though both the program name "Image edit (for bookbinding)" and the program name "Image edit (simplified version)" are displayed, only one of the programs under these program names, again, is operable in the operating environment of the image forming apparatus 3.

The program name "Electronic file (black-and-white read)" indicates a program for use when the black-and-white scanner 34 or 35 is attached to the image forming apparatus 3. When the black-and-white scanner 34 or 35 is selected, a process is carried out to read an original image in black-and-white, and store image data in a compressed form. Thus, a large number of original images may be stored. The compression of the black-and-white image data will not lower image quality. The program name "Image edit (simplified version)" indicates a program for use when the finisher 45 or 46 for stapling only is attached to the image forming apparatus 3.

Subsequently, at the server 1 the controller 9, upon receipt of the request for the program, requests operating environment information from the image forming apparatus 3 through the Internet 2 as shown in FIG. 7.

At the image forming apparatus 3, the controller 15, upon receipt of the request for operating environment information from the server 1, starts the environment information generator 12. The environment information generator 12 determines the operating environment of the image forming apparatus 3, and generates operating environment information, and the operating environment information is transmitted through the Internet 2 to the server 1 as shown in FIG. 7.

At the server 1, the operating environment information is applied to the operation determiner 7. The operation determiner 7 determines the operating environment of the image forming apparatus 3 indicated by the operating environment information, and determines whether the program requested previously is operable in the operating environment. When the program is found operable, the controller 9 notifies the result of determination to the image forming apparatus 3, and thereafter supplies the program to the image forming apparatus 3, as shown in FIG. 7.

At the image forming apparatus 3, the controller 15 displays on the display screen 52 the result of determination that the program is operable. Further, the controller 15 stores the program in the memory 13, and runs this program for trial. When the trial run of this program is completed without trouble, the controller 15 notifies a confirmation of operation through the Internet 2 to the server 1, ends the communication with the server 1 and disconnects the line as shown in FIG. 7.

When, at the server 1, the operation determiner 7 determines that the program is inoperable, the controller 9 stores this result in the user information memory 5, and notifies the result to the image forming apparatus 3. Subsequently, the controller 9, instead of supplying the program, notifies a re-request for a program to the image forming apparatus 3. Then, the controller 9 goes on standby for a re-request for a program to be made by the image forming apparatus 3.

At the image forming apparatus 3, the controller 15 displays on the display screen 52 the result of determination that the program is inoperable, displays also the program list on the display screen 52 and prompts the user to re-select a required program. When a required program is selected from the program list, the controller 15 requests the selected program from the server 1 through the Internet 2.

At the server 1, a determination is made, as before, whether the program is operable in the operating environment of the image forming apparatus 3. When found operable, the program is supplied to the image forming apparatus 3. Otherwise, a re-request is notified to the image forming apparatus 3.

Thus, when a program list is displayed showing all programs that can be supplied to the image forming apparatus 3, the user possibly selects a program inoperable in the operating environment of the image forming apparatus 3. However, instead of receiving this program, the user at the image forming apparatus 3 can request and try a next, different program. The user takes no chance of buying a useless program. In addition, the user becomes aware of all programs that can be supplied to the image forming apparatus 3. The dealer at the server 1 stores, in the user information memory 5, the result of determination that certain programs are inoperable. Based on the information in the user information memory 5, the dealer may grasp what requests made by the user have not been met. Thus, the dealer may develop new programs to meet the requirements of this user, thereby providing improved services.

The present invention is not limited to the foregoing embodiments, but may be modified in various ways. For example, the invention is applicable not only to image forming apparatus, but also to other types of user terminals such as a personal computer, portable terminal and the like. The programs supplied do not necessarily extend the functions of the user terminal. With portable terminals in particular, emphasis is placed on their portability, and extension functions are not of primary concern. However, the invention may advantageously be applied to such portable terminals since program upgrading is strongly desired. Further, where a great number of programs have to be listed, the programs may be classified into a plurality of program lists. A parent list showing the program lists may be prepared and transmitted from the server to the user terminal. Then, a program list selected from this parent list may be requested from the user terminal to the server, and the server may transmit this program list to the user terminal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A program supplying method for supplying a program from a server through a network to an image forming apparatus including an apparatus main body and one or more of a plurality of different optional units combined therewith, the program supplying method comprising:

initiating, in response to a user input to the image forming apparatus, a program supplying operation for supplying the program;

determining an operating environment of the image forming apparatus based on which one or more of the plurality of different optional units is combined with the apparatus main body;

transmitting, from the image forming apparatus through the network to the server before the program is supplied, operating environment information indicative of the determined operating environment;

determining at the server whether the program is operable in the operating environment based on the operating environment information and transmitting, from the server through the network to the image forming apparatus, a result of the determination; and supplying the program from the server to the image forming apparatus if the program is determined to be operable in the operating environment.

2. The program supplying method of claim 1, further comprising:

displaying at the image forming apparatus the result of the determination as to whether the program is operable.

3. The program supplying method of claim 1, further comprising:

generating a program list indicative of programs which can be supplied by the server;

transmitting the program list from the server through the network to the image forming apparatus; and selecting the program from the program list.

4. The program supplying method of claim 1, further comprising:

generating a program list indicative of programs operable in the operating environment of the image forming apparatus based on the operating environment information;

transmitting the program list from the server through the network to the image forming apparatus; and selecting the program from the program list.

5. The program supplying method of claim 1, further comprising:

when the program is determined as being inoperable, recording, at the server, the result of the determination as information regarding the image forming apparatus.

6. The program supplying method of claim 1, further comprising:

installing the program supplied from the server through the network on the image forming apparatus, thereby extending functions of the image forming apparatus.

7. A program supplying system comprising:

an image forming apparatus including an apparatus main body and one or more of a plurality of different optional units combined therewith;

a server from which a program is supplied through a network to the image forming apparatus, wherein the image forming apparatus further includes an operating portion operable by a user to initiate a program supplying operation and operating environment determining means for determining an operating environment of the image forming apparatus based on which one or more of the plurality of different optional units are combined with the apparatus main body, the image forming apparatus transmitting operating environment information indicative of the determined operating environment through the network to the server before the program is supplied, wherein the server includes operation determining means for determining whether the program is operable in the operating environment based on the operating environment information received from the image forming apparatus, the server transmitting a result of the determination as to operability through the network to the image forming apparatus, and wherein the server transmits the program to the image forming apparatus if the program is determined by the operating determining means to be operable in the operating environment of the image forming apparatus.

8. The program supplying system of claim 7, wherein the operating portion of the mage forming apparatus further includes a display for displaying the result of the determination received from the operation determining means of the server.

9. The program supplying system of claim 8, wherein the server further includes list generating means for generating a program list indicative of programs which can be supplied to the image forming apparatus, the server transmitting the program list through the network to the image forming apparatus, and the image forming apparatus displays the program list on the display, and the program is selected from the program list in response to an operation of the operating portion.

10. The program supplying system of claim 8, wherein the server further includes list generating means for generating a program list indicative of programs operable in the operating environment of the image forming apparatus, and the server transmits the program list through the network to the image forming apparatus, and the image forming apparatus displays the program list on the display, and the program is selected from the program list in response to an operation of the operating portion.

11. The program supplying system of claim 7, wherein the server further includes recording means for recording information regarding the image forming apparatus, and the server records the result of the determination in the recording means when the operation determining means determines the program as being inoperable.

12. The program supplying system of claim 7, wherein the image forming apparatus installs the program supplied from the server to the image forming apparatus through the network, thereby extending functions of the image forming apparatus.

13. The program supplying system of claim 7, wherein the image forming apparatus a complex type digital image forming apparatus.

14. A method of supplying a program from a server to one or more image forming apparatuses each of which respectively comprises a main body and one or more of a plurality of different optional units combined with the main body thereof, the program supplying method comprising:

sending from one of the image forming apparatuses to the server, in response to a user input to that one image forming apparatus, a request for a list of programs;

sending from the server to the one image forming apparatus, in response to the program list request received from the one image forming apparatus, an operating environment information request;

determining, in response to the operating environment information request received from the server, an operating environment of the one image forming apparatus, the operating environment being based at least in part on which one or more of the plurality of different optional units are combined with the main body thereof;

sending from the one image forming apparatus to the server operating environment information indicative of the determined operating environment;

determining, based on the operating environment information received from the one image forming apparatus, which programs stored in the server are operable in the one image forming apparatus;

sending from the server to the one image forming apparatus a list of the programs stored in the server that are operable in the one image forming apparatus;

displaying the program list received from the server on a display of the one image forming apparatus;

receiving at the one image forming apparatus a user input selecting one of the programs from the program list;

sending from the one image forming apparatus to the server, in response to the user input, selection data corresponding to the program selected from the program list; and sending from the server to the one image forming apparatus, in response to the selection data received from the one image forming apparatus, the selected program.

15. A method of supplying a program from a server to one or more image forming apparatuses each of which respectively comprises a main body and one or more of a plurality of different optional units combined with the main body thereof, the program supplying method comprising:

sending from one of the image forming apparatuses to the server, in response to a user input to that one image forming apparatus, a request for a list of programs;

sending from the server to the one image forming apparatus, in response to the program list request received from the one image forming apparatus, the list of programs;

displaying the program list received from the server on a display of the one image forming apparatus;

receiving at the one image forming apparatus a user input selecting one of the programs from the program list;

sending from the one image forming apparatus to the server, in response to the user input, selection data corresponding to the program selected from the program list;

sending from the server to the one image forming apparatus, in response to the selection data received from the one image forming apparatus, an operating environment information request;

determining, in response to the operating environment information request received from the server, an operating environment of the one image forming apparatus, the operating environment being based at least in part on which one or more of the plurality of different optional units are combined with the main body thereof;

sending from the one image forming apparatus to the server operating environment information indicative of the determined operating environment;

determining, based on the operating environment information received from the one image forming apparatus, whether the selected program is operable in the one image forming apparatus;

sending from the server to the one image forming apparatus, if the selected program is operable in the one image forming apparatus, the selected program; and sending from the server to the one image forming apparatus, if the selected program is not operable in the one image forming apparatus, an invitation to select another program.

* * * * *